United States Patent
Marques et al.

(10) Patent No.: US 11,318,402 B2
(45) Date of Patent: May 3, 2022

(54) ROTARY VESSEL WITH A SPIGOT HAVING A NON-CIRCULAR OUTER CIRCUMFERENTIAL CROSS-SECTION FORMING AN AXIAL MOVEMENT LIMITING ENGAGEMENT WITH A HOUSING CLOSURE MEMBER

(71) Applicant: MANN+HUMMEL GmbH, Ludwigsburg (DE)

(72) Inventors: Tiago Marques, Leca da Palmeira (PT); Robin Nash, Langport (GB); Angus Rouse, Leeds (GB); Anthony W. Fell, Yeovil (GB)

(73) Assignee: MANN+HUMMEL GmbH, Ludwigsburg (DE)

( * ) Notice: Subject to any disclaimer, the term of this patent is extended or adjusted under 35 U.S.C. 154(b) by 831 days.

(21) Appl. No.: 15/997,834

(22) Filed: Jun. 5, 2018

(65) Prior Publication Data

US 2018/0345189 A1  Dec. 6, 2018

(30) Foreign Application Priority Data

Jun. 5, 2017 (GB) ...................... 1708930

(51) Int. Cl.
| | | |
|---|---|---|
| *B01D 35/30* | (2006.01) | |
| *B04B 5/00* | (2006.01) | |
| *F01M 11/03* | (2006.01) | |
| *B04B 9/12* | (2006.01) | |
| *B01D 33/067* | (2006.01) | |
| *B01D 33/11* | (2006.01) | |

(Continued)

(52) U.S. Cl.
CPC ......... *B01D 35/306* (2013.01); *B01D 33/067* (2013.01); *B01D 33/11* (2013.01); *B04B 5/005* (2013.01); *B04B 9/12* (2013.01); *F01M 11/03* (2013.01); *F16B 21/086* (2013.01); *B04B 2001/2041* (2013.01); *F16N 2039/065* (2013.01)

(58) Field of Classification Search
CPC .... B01D 35/306; B01D 33/067; B01D 33/11; F01M 11/03; F01M 11/00; B04B 9/12; B04B 5/005; B04B 2001/2041; B04B 7/02; F16B 21/086; F16N 2039/065
USPC .................................. 494/36, 43, 49, 60, 83
See application file for complete search history.

(56) References Cited

U.S. PATENT DOCUMENTS

2015/0005559 A1    1/2015  Xu

FOREIGN PATENT DOCUMENTS

| DE | 20100362 U1 | 12/2001 |
|---|---|---|
| DE | 10305960 A1 | 8/2003 |

(Continued)

*Primary Examiner* — Walter D. Griffin
*Assistant Examiner* — Shuyi S. Liu

(57) ABSTRACT

A rotary vessel for a filter assembly has a rotor body rotatable about an axis of rotation and a spigot with a non-circular cross-section and integral with or coupled to the rotor body. The spigot extends away from the rotor body along the axis of rotation and engages with a bearing. The spigot facilitates transfer of rotary motion between the rotor body and the bearing. A filter assembly has a housing with a main body and a closure member separably attachable to the main body. The rotary vessel is disposed inside the housing. The closure member retains the rotary vessel inside the housing and is separable from the main body to permit removal of the rotary vessel from the housing. The spigot integral with or coupled to the rotor vessel engages with a bearing of the filter assembly to rotatably support the rotary vessel in the housing.

9 Claims, 5 Drawing Sheets

(51) Int. Cl.
*F16B 21/08* (2006.01)
*F16N 39/06* (2006.01)
*B04B 1/20* (2006.01)

(56) References Cited

FOREIGN PATENT DOCUMENTS

| | | |
|---|---|---|
| DE | 202004004215 U1 | 7/2005 |
| GB | 2517504 A | 2/2015 |

ROTARY VESSEL WITH A SPIGOT HAVING A NON-CIRCULAR OUTER CIRCUMFERENTIAL CROSS-SECTION FORMING AN AXIAL MOVEMENT LIMITING ENGAGEMENT WITH A HOUSING CLOSURE MEMBER

TECHNICAL FIELD

The invention relates to a rotary vessel. The invention particularly, but not necessarily, relates to a rotary vessel for a filter assembly.

BACKGROUND OF THE INVENTION

Filter assemblies are known for removing contaminant particles from lubricating oil circuits of internal combustion engines. They are also known for separating particulate matter from liquids, as well as separating liquids of different densities from one another, in a variety of industrial processes. Typically, a filter assembly comprises a housing comprising a rotor supported therein to spin about a spindle, the spindle providing an axis of rotation. A working fluid from which a contaminant is to be removed, e.g. engine oil, is supplied at elevated pressure along the axis of rotation to the rotor. Subsequently, the pressurized fluid is tangentially ejected from the rotor such that the rotor is caused to spin. As the working fluid flows through the spinning rotor, denser contaminants or particles are separated therefrom by centrifugal force and retained in the rotor, typically as a cake adhering to an interior surface of the rotor. Ejected fluid drains to a sump.

As retained contaminant particles agglomerate in the rotor, it is necessary to replace or service the rotor at suitably regular intervals to ensure the continued cleaning effectiveness of the filter assembly. It is common that servicing of the rotor requires its removal from the housing. Servicing and replacement of the rotor may be time consuming and difficult due to limited available space if the filter assembly is in situ.

SUMMARY OF THE INVENTION

It is an object of the invention to at least reduce a problem associated with one or more known arrangements.

According to a first aspect of the invention, there is provided a rotary vessel for a filter assembly, the rotary vessel comprising: a rotor body rotatable about an axis of rotation; and a spigot comprising a non-circular cross-section integral or coupled to the rotor body and extending therefrom along the axis of rotation for engagement with a bearing. This arrangement may inhibit rotation of the spigot when engaged with a bearing in a filter assembly, thus reducing wear of the spigot.

In certain embodiments, the non-circular cross-section may be a polygonal cross section. The spigot may comprise one or more fingers each comprising a free end furthest from the rotor body, the fingers may at least in part define a periphery of the spigot. One or more of the fingers may each comprise a substantially planar surface at least in part defining the periphery of the spigot. One or more of the fingers may each taper away from the rotor body. A plurality of the one or more fingers may be spaced about the spigot intermediate a plurality of gaps separating adjacent fingers. The rotary vessel may be self-powerable in that the rotor body may have a drive nozzle for emitting a pressurized working fluid therefrom to cause rotation of the rotor body by a reactive force.

According to a second aspect of the invention, there is provided a filter assembly comprising: a rotary vessel; a housing comprising a main body and a closure member separably attachable to the main body to retain the rotary vessel within the housing, the closure member being separable from the main body to permit removal of the rotary vessel from the housing; and a spigot comprising a non-circular cross-section integral or coupled to the rotary vessel, the spigot being engageable with a bearing to rotatably support the rotary vessel to the housing.

According to a third aspect of the invention, there is provided a filter assembly comprising: a housing comprising a main body and a closure member separably attachable to the main body to retain a rotary vessel within the housing, the closure member being separable from the main body to permit removal of the rotary vessel from the housing; and a spigot comprising a non-circular cross-section integral or coupled to the housing, the spigot being engageable with a bearing to rotatably support the rotary vessel to the housing. The filter assembly may comprise a rotary vessel.

Optionally, the closure member may be separable from the main body by a rotation of the closure member relative to the main body. The rotary vessel and the spigot may be as described above and the bearing is integral or coupled to the closure member. The bearing may comprise a sleeve with which the spigot is engageable, the sleeve being rotatable relative to the closure member and configured to inhibit rotation of the spigot relative to the sleeve.

According to a fourth aspect of the invention, there is provided a filter assembly comprising: a housing comprising a main body and a closure member separably attachable to the main body to retain a rotary vessel within the housing, the closure member being separable from the main body by rotation of the closure member relative to the main body to permit removal of the rotary vessel from the housing; and a locking member releasably engageable with the housing to inhibit rotation of the closure member relative to the main body. The locking member may inhibit accidental separation of the closure member from the main body. In certain embodiments, the locking member may be releasably engageable with the housing by snap-fit engagement. The locking member may be releasably engageable with the main body to inhibit rotation of the locking member relative to the main body.

Optionally, the locking member may be axially movable relative to the main body into and out of a locking position in which rotation of the locking member relative to the housing is inhibited. The locking member may be axially moveable relative to the main body between the locking position and a release position in which the locking member may be rotatable relative to the main body to release the locking member from engagement with the main body. The locking member may be releasably engageable with the closure member to inhibit rotation of the locking member relative to the closure member. The locking member may be axially movable relative to the closure member into and out of the locking position.

In certain embodiments, the locking member may be releasably engageable with the closure member by insertion of the locking member into an open end of the closure member. The locking member may be releasably engageable with the closure member in that the locking member achieves a form fit with at least a portion of the closure member to inhibit rotation of the locking member relative to the closure member. The closure member may comprise a first formation comprising a non-circular cross-section and/or the locking member may comprise a second formation complementary to the first formation to provide at least in part the form fit. The first formation may be a non-circular aperture. The locking member may comprise a body portion. The locking member may comprise one or more lugs, which may extend radially from the body portion to effect releasable engagement of the locking member and main body.

One or more of the lugs may each comprise a hooked portion to effect releasable engagement of the locking member and main body by abutment with one or more retaining surfaces of the main body. One or more of the lugs may each be elastically deformable such that the respective hooked portions are each radially moveable relative to the body portion by deformation of the respective lugs. Optionally, the main body may comprise one or more rotation inhibiting surfaces which, in use, one or more of the lugs may each abut to inhibit rotation of the locking member relative to the main body. In the release position, one or more of the lugs may each be deformable by rotation of the locking member relative to the main body to effect release the locking member from engagement with the main body. The locking member may be of single piece construction.

In certain embodiments, the main body and the closure member comprise respective threaded portions that may be cooperable with one another to separably attach the main body to the closure member. The closure member may be separably attachable to the main body by insertion of the closure member into an open end of the main body. The closure member may be sealable against the main body by a resilient seal extending along a periphery of the closure member. The filter assembly may comprise a rotary vessel within the housing. Optionally, the rotary vessel may be self-powerable in that the rotary vessel may comprise a rotor body comprising a drive nozzle for emitting a pressurized working fluid therefrom to cause rotation of the rotary vessel by a reactive force.

According to a fifth aspect of the invention, there is provided a rotary vessel for a filter assembly, the rotary vessel comprising: a rotor body rotatable about an axis of rotation; and a spigot integral or coupled to the rotor body and extending therefrom along the axis of rotation, the spigot comprising an abutment surface against which, in use, a cooperating surface abuts to inhibit a movement of the rotary vessel relative to the cooperating surface and parallel to the axis of rotation. This arrangement may facilitate removal of the rotatory vessel when installed as part of a filter assembly.

The abutment surface may at least in part be provided on or coupled to one or more protrusions extending radially from the spigot relative to the axis of rotation. Additionally, or alternatively, the abutment surface may at least in part provided on or coupled to one or more recesses or grooves extending radially into the spigot relative to the axis of rotation. The abutment surface may be a discontinuous surface extending about the spigot. In certain embodiments, the spigot may comprise one or more elastically deformable portions upon which the abutment surface is provided on or coupled to such that the abutment surface may be radially moveable relative to the axis of rotation by deformation of the one or more elastically deformable portions. One or more of the elastically deformable portions may each be a radially deformable finger comprising a free end furthest from the rotor body. The abutment surface may at least in part be provided on or coupled to one or more of the free ends of each of the radially deformable fingers. One or more of the radially deformable fingers may each taper away from the rotor body. A plurality of the one or more elastically deformable portions may be spaced about the spigot intermediate a plurality of substantially non-deformable portions.

Optionally, one or more of the substantially non-deformable portions may each be a substantially non-deformable finger. One or more of the elastically deformable portions may each comprise a respective cam surface, each of the elastically deformable portions being deformable by a force acting against the respective cam surface parallel to the axis of rotation. One or more of the cam surfaces may each be provided on or coupled to one or more of the protrusions. The spigot may be substantially circular in cross section. The rotary vessel may be self-powerable in that the rotor body may have a drive nozzle for emitting a pressurized working fluid therefrom to cause rotation of the rotor body by a reactive force.

According to a sixth aspect of the invention, there is provided a filter assembly comprising: a housing comprising a main body and a closure member separably attachable to the main body to retain a rotary vessel within the housing, the closure member being separable from the main body to permit removal of the rotary vessel from the housing; and a connector to releasably couple the closure member to the rotary vessel such that the rotary vessel is at least partially removable from the housing by separation of the closure member and the main body. The closure member may be separable from the main body by a rotation of the closure member relative to the main body. The connector is a snap-fit connector. The filter assembly may comprise a rotary vessel.

In certain embodiments, the rotary vessel may be that as described above, the spigot at least in part forming the connector and the closure member comprising the cooperating surface such that abutment of the abutment surface and the cooperating surface inhibits the movement of the rotary vessel relative to the cooperating surface to releasably couple the closure member to the rotary vessel. The closure member may comprise a sleeve for receiving the spigot to rotatably support the rotary vessel in the housing, the sleeve incorporating the cooperating surface. The sleeve may incorporate the cooperating surface at an open end of the sleeve. The closure member may comprise a bearing assembly, the bearing assembly incorporating the sleeve.

Features described above with reference to one aspect of the invention will be understood to be compatible with those described above with reference to other aspects of the invention.

BRIEF DESCRIPTION OF THE DRAWINGS

Embodiments of the invention will now be described by way of example only, with reference to the accompanying Figures.

DESCRIPTION OF PREFERRED EMBODIMENTS

Figure 1:
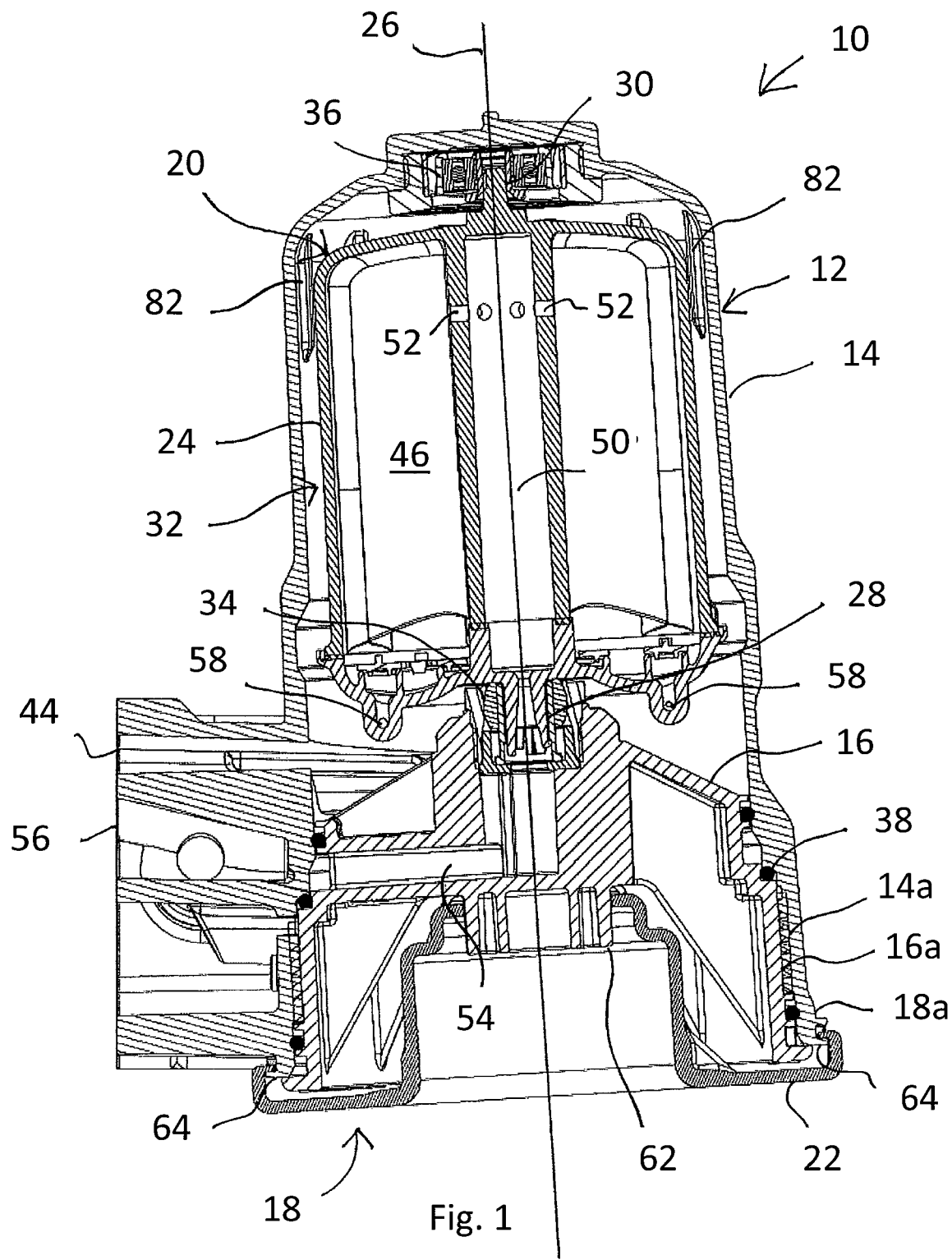
FIG. 1 is a cross sectional view of a filter assembly according to an embodiment of the invention comprising a locking member shown in a locking position.

FIG. 1 shows a filter assembly 10 according to an embodiment of the invention. The filter assembly 10 has particular application in a motor vehicle, e.g. for cleaning engine oil in an engine lubrication system. However, other applications are contemplated, e.g. for use in oil recovery and in the manufacture of food products.

The filter assembly 10 comprises a housing 12 comprising a main body 14 and a closure member 16. The closure member 16 is separably attachable to the main body 14. As in the illustrated embodiment, the closure member 16 may be separably attachable to the main body 14 by insertion of the closure member 16 into an open end 18 of the main body 14. The open end 18 may be an underside end of the main body 14, i.e. an end accessible from underneath during use. The open end 18 may be defined, i.e. delimited, by an annular wall 18a of the main body 14. To effect attachment of the closure member 16 to the main body 14, each of the main body 14 and the closure member 16 may comprise respective threaded portions 14a, 16a. Thus, the main body 14 and the closure member 16 may be separably attachable to one another by threaded engagement, i.e. the main body 14 and the closure member 16 may be screwed together and apart by a user. However, in alternative embodiments, any suitable means for attaching the closure member 16 to the main body 14 may be used, e.g. each of the main body 14 and the closure member 16 may be configured to form a bayonet-type connection. As in the illustrated embodiment, the closure member 16 may be separable from the main body 14 by rotation, as least in part, of the closure member 16 relative to the main body 14.

The filter assembly 10 further comprises a rotary vessel 20 and a locking member 22. The rotary vessel 20 comprises a rotor body 24 that is rotatable about an axis of rotation 26. (Reference herein to axial movement, axial extension, etc. is to that at least generally parallel to the axis of rotation 26. Reference herein to radial movement, radial extension, etc. is to that at least generally perpendicular to the axis of rotation 26.) The rotary vessel 20 and the rotor body 24 may be rotatable about the axis of rotation together as one. The rotary vessel 20 further comprises a lower spigot 28 and an upper spigot 30. Each of the lower and upper spigots 28, 30 may be coupled or integral to the rotor body 24 and extend axially therefrom along the axis of rotation 26. Thus, the lower and upper spigots 28, 30 are collinear. As will be understood, the lower spigot 28 may extend from a lower end of the rotor body 24 and the upper spigot 30 may extend from an upper end of the rotor body 28, i.e. opposite to the lower spigot 28. The rotary vessel 20 is retained within the housing 12 by attachment of the closure member 16 to the main body 14. In certain embodiments, the main body 14 may locate and support the upper spigot 30 within the housing 12. Additionally, or alternatively, the closure member 16 may locate and support the lower spigot 28 within the housing 12. To this end, the main body 14 and the closure member 16 may be provided with respective bearings 34, 36 that are configured to receive the lower and upper spigots 28, 30, respectively. In the illustrated embodiment, the bearings 34, 36 are shown to be multi-part components. However, the bearings 34, 36 may be any arrangement suitable for allowing the rotary vessel 20 to rotate relative to the housing 12, e.g. one or each of the bearings 34, 36 may be an aperture or recess configured to receive one of the lower and upper spigots 28, 30. The closure member 16 may be separable from the main body 14 to effect removal of the rotary vessel 20 from the housing 12.

Attachment of the closure member 16 to the main body 14 may form a fluid tight volume 32, which, in use, encloses the rotary vessel 20. To this end, the closure member 16 may be fluidly sealable against the main body 14 by a resilient seal 38 extending along a periphery of the closure member 16. In certain embodiments, the resilient seal 38 may be alternatively provided on the main body 14.

The filter assembly 10 may further comprise a fluid supply duct 50 extending through the centre of the rotor body 24, i.e. extending along the axis of rotation 26, for supplying an inner chamber 46 of the rotor body 24 with a working fluid, i.e. a fluid to cleaned/filtered, e.g. engine oil. The inner chamber 46 may be fluidly connected to the fluid supply duct 50 by one or more through bores 52 provided in a side walling of the fluid supply duct 50. The through bores 52 may extend through the side walling substantially at right angles to the axis of rotation 26. An inlet duct 54 may extend through the closure member 16 to supply working fluid from an inlet port 56 to the fluid supply duct 50. In use, the working fluid may be supplied to the inlet port 56 at elevated pressure to flow from the inlet port 56 to the through bores 52, via both of the inlet duct 54 and the fluid supply duct 50. The working fluid exits the through bores 52 into the inner chamber 46 of the rotor body 24. As in the illustrated embodiment, the rotary vessel 20 may be self-powerable, i.e. the pressurized supply of working fluid may drive rotation of the rotor body 24. To this end, the rotor body 24 may further comprise a pair of diametrically opposed drive nozzles 58 fluidly connected with the inner chamber 46 of the rotor body 24. The drive nozzles 58 are each provided at a radial distance from the axis of rotation 26 (about which the rotor body 24 is rotatable) and configured such that the working fluid exits the inner chamber 46, through the drive nozzles 58, in a direction generally tangential to the rotor body 24. As will be understood, the tangential emission of the working fluid, at elevated pressure, results in a reactive force that causes rotation of the rotor body 24 about the axis of rotation 26.

As working fluid flows through the spinning rotary vessel 20, centrifugal force causes separation of contaminant material within the working fluid. Separated contaminant material may accumulate within the inner chamber 46 of the rotor body 24, primarily as a cake adhering to an interior surface of the inner chamber 46 or to a liner provided therein. Fluid exiting the rotor body 24 may drain to a sump and exit the filter assembly 10 though an outlet port 44. As contaminant accumulates within the inner chamber 46, the filter assembly 10 must be serviced, e.g. either to clean or replace the rotary vessel 20. To service the filter assembly 10, it may be necessary to remove the rotary vessel 20 from within the housing 12. Removal of the rotary vessel 20 from within the housing 12 requires separation of the closure member 16 from the main body 14. In the illustrated embodiment, the closure member 16 is rotatable, e.g. it may be unscrewed by a user, relative to the main body 14 in a first direction to effect the necessary separation. The first direction may be clockwise or anti-clockwise.

Problematically, rotation of the closure member 16 relative to the main body 14 may be induced by vibration of the filter assembly 10. Vibration may occur as a result of the rotor body 24 rotating within the housing 12. Such induced rotation of the closure member 16 is undesirable, as it may result in accidental separation or unsealing of the closure member 16 from the main body 14, thus causing working fluid to leak from the filter assembly 10. Leaked working fluid, which may be flammable, may pose a fire hazard. Moreover, the undesirable rotation of the closure member 16 relative to the main body 14 may be exacerbated by the weight of the rotary vessel 20 acting downwards upon the closure member 16, as is the case in the illustrated embodiment. The undesirable rotation of the closure member 16 may be inhibited by the locking member 22. To this end, the locking member 22 is releasably engageable with at least part of the housing 12 to inhibit rotation of the closure member 16 relative to the main body 14, as is described in more detail below.

The locking member 22 may be releasably engageable with at least part of the housing 12 by snap-fit engagement. As in the illustrated embodiment, the locking member 22 may be releasably engageable with the main body 14 by snap-fit engagement. Snap-fit engagement is advantageous as it may facilitate rapid construction, i.e. assembly, and/or servicing of the filter assembly 10, without the use of tools, and may reduce the number of loose and/or separate component parts that make up the filter assembly 10. As will be appreciated, various types of snap-fit engagement are possible, e.g. cantilever snap-fit engagement, torsional snap-fit engagement and annular snap-fit engagement. (Described herein is a non-limiting arrangement that provides a cantilever snap-fit engagement of the locking member 22 to the housing 12.)

As shown in the accompanying figures, the locking member 22 may be releasably engageable with the closure member 16. More specifically, the locking member 22 may be releasably engageable with the closure member 16 by insertion of the locking member 22 into an open end of the closure member 16. Releasable engagement of the locking member 22 with the closure member 16 may inhibit rotation of the locking member 22 relative to the closure member 16, at least in one direction. Additionally, or alternatively, the locking member 22 may be releasably engageable with the main body 14. The locking member 22 may be releasably engageable with the main body 14 such that rotation of the locking member 22 relative to the main body 14 is inhibited, at least in one direction. Thus, with the locking member 22 simultaneously engaged with both the closure member 16 and the main body 14, the locking member 22 may be both inhibited from rotation relative to the main body 14 in the first direction and inhibited from rotation relative to the closure member 16 in a second direction, the second direction being opposite to the first direction. Consequently, rotation of the closure member 16 relative to the main body 14 in the first direction may be inhibited to prevent the accidental separation or unsealing of the closure member 16 from the main body 14.

Figure 2:
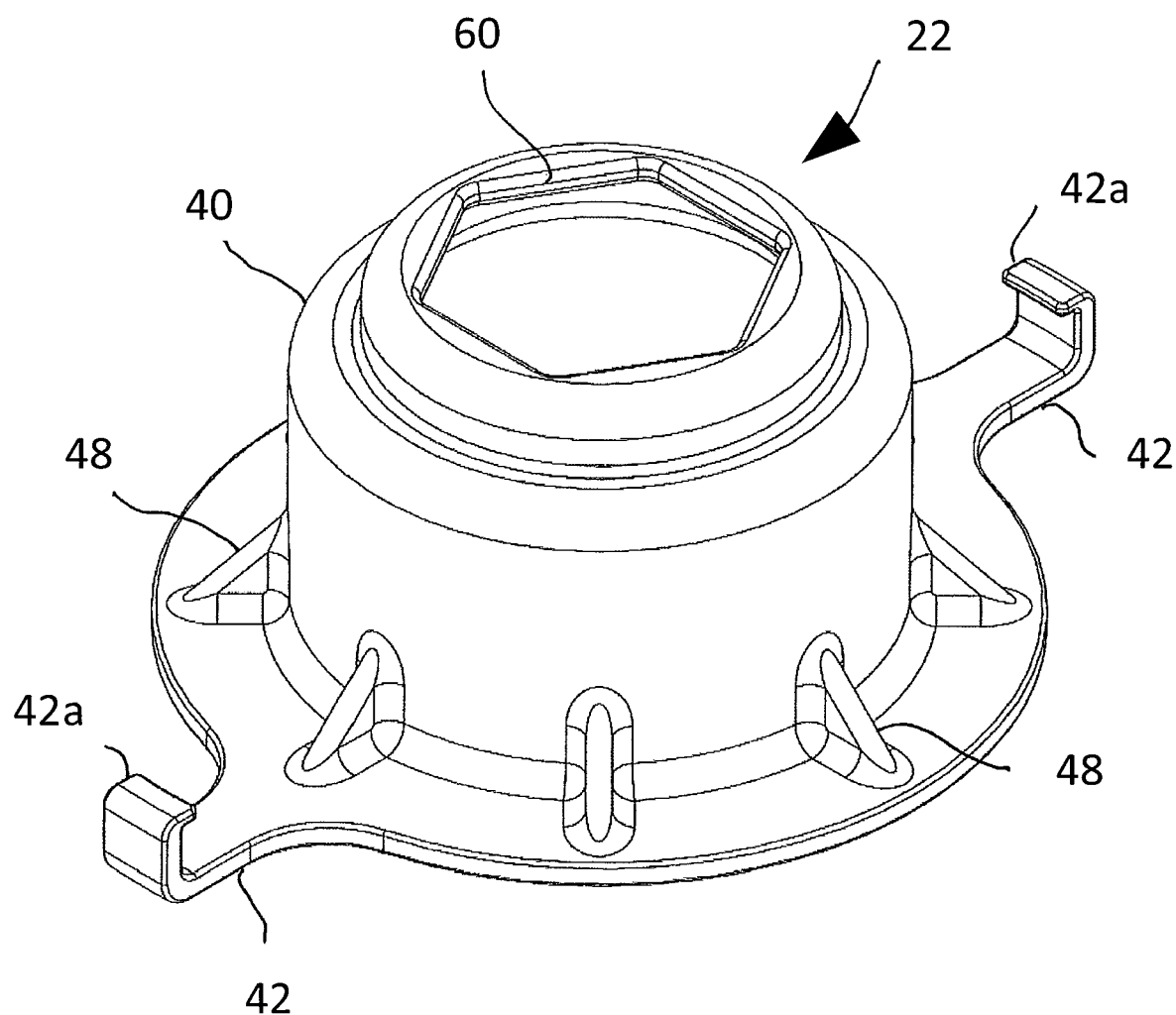
FIG. 2 is a perspective view of the locking member of FIG. 1 shown separately from the filter assembly.

FIG. 2 shows an embodiment of the locking member 22. To effect releasable engagement of the locking member 22 with the closure member 16, at least a portion of the locking member 22 may achieve a form fit with a portion of the closure member 16, i.e. contours and/or shapes of the locking member 22 may allow for snug engagement of the locking member 22 with the closure member 16. To this end, the locking member 22 may comprise a first formation 60 and the closure member 16 may comprise a second formation 62, the second formation 62 being complementary to the first formation 60. As will be understood, it is the form fit of the locking member 22 with the closure member 16 which may inhibit relative rotation of the two parts. As shown in the illustrated embodiment, the first formation 60 may be non-circular, e.g. polygonal. The first formation 60 may be an aperture extending through a portion of the locking member 22. In certain embodiments, a peripheral surface of the locking member 22 may achieve a form fit with a surface of the closure member 16. Additionally, or alternatively, the locking member 22 may comprise one or more radially extending ribs 48 engageable with complementary indents in the closure member 16. As shown in the accompanying figures, the locking member 22 may be of single piece construction. The locking member 22 may be moulded from a plastics material.

As shown in the accompanying Figures, the locking member 22 may comprise a body portion 40 and one or more lugs 42. The body portion 40 may be annular. The lugs 42 may extend radially from the body portion 40. The lugs 42 may each comprise a respective hooked portion 42a. The hooked portions 42a may be formed at or coupled to free ends 42a of the lugs 42, i.e. ends of the lugs 42 furthest from the body portion 40. The hooked portions 42a may permit each of the lugs 42 to extend around the annular wall 18a at the open end 18 of the main body 14 to engage with a respective radially extending formation 64 coupled or integral to a peripheral surface of the main body 14. Each of the radially extending formations 64 may extend radially from or into the peripheral surface of the main body 14. Each of the radially extending formations 64 may form one or more rotation inhibiting surfaces 66 (e.g. see FIG. 4) against which a respective lug 42 abuts to inhibit rotation of closure member 16 relative to the main body 14, i.e. each of the rotation inhibiting surfaces 66 may block, i.e. interrupt, a circumferential path of the lugs 42 extending about the main body 14. This is described in more detail below. One or more of the rotation inhibiting surfaces 66 may be a surface substantially parallel to the axis of the axis of rotation 26.

Additionally, or alternatively, the lugs 42 may effect releasable engagement of the locking member 22 and main body 14, i.e. the lugs 42 may be configured to cooperate with the main body 14 to releasably engage the locking member 22 with the main body 14, such that axial movement of the locking member 22 relative the main body 14 is inhibited, at least in one direction. More specifically, the lugs 42 may abut one or more retaining surfaces 68 that are integral or coupled to the main body 14, to prevent release of the locking member 22 from engagement with the main body 14. To this end, the retaining surfaces 68 may obstruct an axial path of the lugs 42. Each of the radially extending formations 64 may form one or more of the retaining surfaces 68, in addition to, or instead of, one or more of the rotation inhibiting surfaces 66. One or more of the retaining surfaces 68 may be a surface substantially perpendicular to the axis of the axis of rotation 26.

At least a portion of each of the lugs 42 may be elastically deformable, i.e. flexible/pliable. Consequently, radial movement of the hooked portions 42a may be permitted by deformation of the lugs 42. This radial movement may effect release of the locking member 22 from engagement with the main body. This is described in more detail below. As shown in the illustrated embodiment, the locking member 22 may be of single piece construction.

Figure 6:
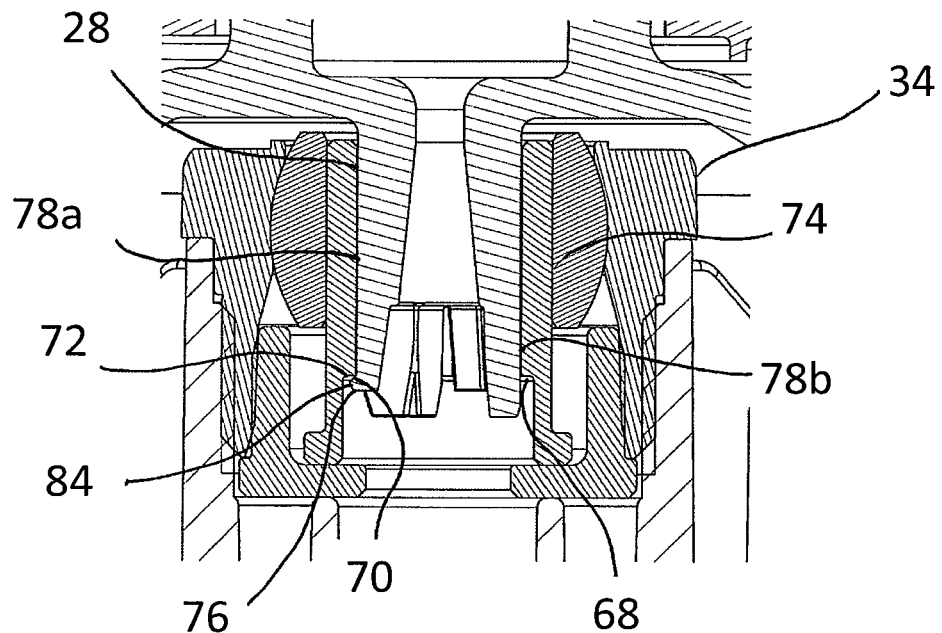
FIG. 6 is an enlarged region of the cross-sectional view of FIG. 1 showing a spigot of a rotor vessel according to an embodiment of the invention.
Figure 7:
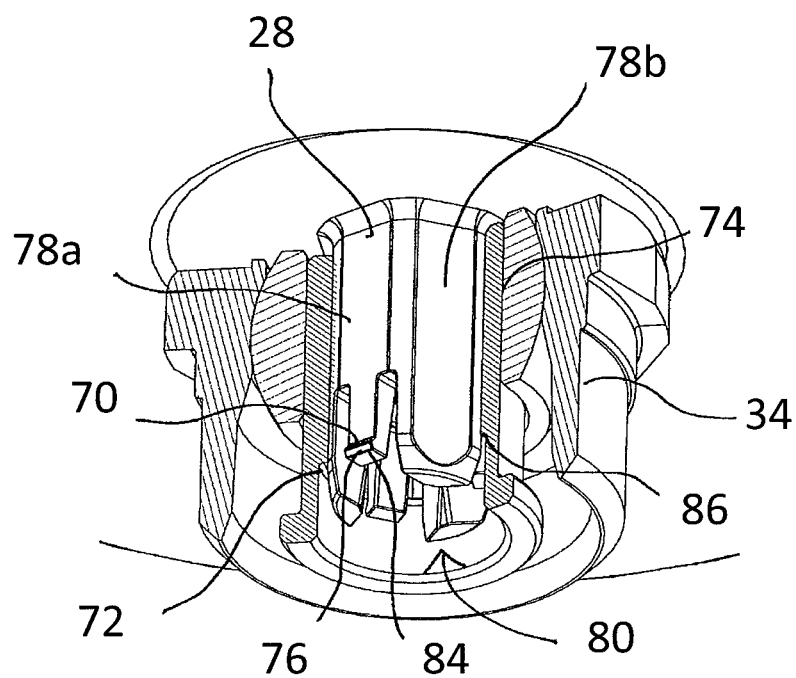
FIG. 7 is a perspective view of the spigot of FIG. 6 engaged with a bearing shown in cutaway to make visible the spigot.

FIGS. 6 and 7 show an embodiment of the lower spigot 28. The lower spigot 28 may have an abutment surface 70 configured for abutment against a cooperating surface 72. Abutment of the abutment surface 70 against the cooperating surface 72 may inhibit axial movement of the rotary vessel 20 relative to the cooperating surface 72. In the illustrated embodiment, the cooperating surface 72 is formed as part of the lower bearing 34. More specifically, the cooperating surface 72 may be provided as an annular surface extending around a surface of a sleeve 74, the sleeve 74 forming part of the lower bearing 34 and being rotatable therewithin. Consequently, as the lower bearing 34 may be provided as part of the closure member 16, abutment of the abutment surface 70 against the cooperating surface 72 may inhibit an axial movement of the rotary vessel 20 relative to the closure member 16. Thus, with the lower spigot 28 engaged with the lower bearing, separation of the closure member 16 from the main body 14 may draw the rotary vessel 20 out from within the housing 12. The lower spigot 28 may comprise one or more protrusions 76 extending radially therefrom, with the abutment surface 70 integral or coupled to the one or more protrusions 76. However, in certain embodiments, the abutment surface 70 may be provided, at least in part, by one or more recesses extending radially into the lower spigot 28. This may be in addition to, or instead of, the abutment surface 70 being provided, at least in part, by the protrusions 76. As shown on the illustrated embodiment, the abutment surface 70 may be a discontinuous surface.

In certain embodiments, the lower spigot 28 may comprise one or more fingers 78a, 78b extending away from the rotor body 24, i.e. each finger 78a, 78b comprising a free end furthest from the rotor body 24. As shown in the accompanying figures, each of the fingers 78a, 78b may extend substantially parallel to the axis of rotation 26. Together, the fingers 78a, 78b may define, i.e. delimit, or surround an opening 80, which may be an opening of the fluid supply duct 50. Additionally, or alternatively, the fingers 78a, 78b may define a periphery of the spigot. As best shown in FIGS. 7 and 6, the periphery of the lower spigot 28 may be non-circular, i.e. the lower spigot 28 may have a non-circular cross section. To this end, each of the fingers 78a, 78b may comprise a substantially planar surface, which may be a radially outmost surface of each respective finger 78a, 78b. As will be understood, each respective substantially planar surface may be inclined with respect to that of an adjacent finger 78a, 78b. The fingers 78a, 78b may abut one another, or gaps may be present between at least a number of adjacent fingers 78a, 78b. To receive the lower spigot 28 of non-circular cross section, the sleeve 74 (FIGS. 6 and 7) of the lower bearing 34 may have an annular inner surface having a non-circular cross-section that is complementary to the non-circular cross section of the lower spigot 28. This complementary non-circular cross section arrangement inhibits the rotation of the lower spigot 28 within the sleeve 74, when received therein, thus reducing wear of the lower spigot 28.

A subset of one of the one or more fingers 78a may be radially elastically deformable, i.e. flexible/pliable, by a radial force applied thereto. The subset of radially elastically deformable fingers 78a may comprise three fingers. The radially deformable fingers 78a may provide one or more elastically deformable portions of the lower spigot 28. However, in alternative embodiments, the elastically deformable portions may be provided by any suitable means, e.g. by a narrowing of a portion of the lower spigot 28. Each of the radially elastically deformable fingers 78a may taper away from the rotor body 24, i.e. narrow in the radial direction away from the rotor body 24, and this may provide the required elastic deformability. Additionally, or alternatively, a subset of the fingers 78b may be substantially non-deformable, i.e. rigid, at least in the radial direction.

Thus, the substantially non-deformable fingers 78b may provide one or more non-deformable portions of the lower spigot 28. The elastically deformable portions and the non-deformable portions may be alternately provided about the lower spigot 28, i.e. each of the elastically deformable portions may be spaced about the spigot intermediate the substantially non-deformable portions.

Each of the protrusions 76 and/or the recesses may be provided on or coupled to, at least in part, one or more of each of the elastically deformable fingers 78a. Each of the protrusions 76 and/or the recesses may be provided at the free ends of the radially elastically deformable fingers 78a. However, each of the protrusions 76 and/or the recesses may alternatively be provided at any suitable location along the length of one or more of the radially elastically deformable fingers 78a. Thus, as will be understood, the abutment surface 70 is radially moveable by deformation of the radially elastically deformable fingers 78a. Such deformation may be caused by a force, acting radially inward, applied to the radially elastically deformable fingers 78a or a part thereof.

In constructing the filter assembly 10, the rotary vessel 20 may be inserted into the main body 14 of the housing 12 through the open end 18. As the rotary vessel 20 is inserted into the main body 14, it may be guided into position by guiding ribs 82 coupled or integral to an inner surface of the housing 12. The guiding ribs 82 may facilitate alignment of the upper spigot 30 with the upper bearing 36 as the rotary vessel 20 is positioned within the housing 12. One or both of the upper spigot 30 and the upper bearing 36 may be configured for frictional engagement with the other. With the rotary vessel 20 fully inserted into the housing 12, the upper spigot 30 may be frictionally engaged with the upper bearing 34 to support the weight the rotary vessel 20, i.e. to inhibit the rotary vessel 20 from falling out of the housing 12 under its own weight. This arrangement may facilitate construction of the filter assembly 10, as the rotary vessel 20 may not need holding in position while construction of the filter assembly 10 is continued and/or completed. Conversely, however, this arrangement may impair deconstruction of the filter assembly 10, e.g. for service and/or repair, as frictional engagement of the upper spigot 30 with the upper bearing may make it difficult to extract the rotary vessel 20 from within the housing 20.

With the rotary vessel 20 received within the main body 14 of the housing 12, the closure member 16 may be releasably attached to the housing 12 to form the fluid tight volume 32. In the illustrated embodiment, the closure member 16 is screwed into the open end 18 of the main body 14. As the closure member 16 is attached to the main body 14, the lower spigot 28 may engage with the lower bearing 34. More specifically, in certain embodiments, the lower spigot 28 may engage with the sleeve 74 of the lower bearing 34. Upon initial, i.e. partial, engagement of the lower spigot 28 with the lower bearing 34, the elastically deformable portions, e.g. the radially elastically deformable fingers 78a, may be caused to resiliently deform. In the illustrated embodiment, as the lower spigot 28 engages with the lower bearing 34, the protrusions 76 of the radially elastically deformable fingers 78a contact an inner wall of the sleeve 74 to urge, i.e. deform, the radially elastically deformable fingers 78a radially inwards. This is because an outermost diameter of the lower spigot 28, which includes the protrusions 76, is larger than an innermost diameter of the sleeve 74. To facilitate the engagement of the lower spigot 28 with lower bearing 34, each of the protrusions 76 may comprise a cam surface 84 inclined with respect to the inner wall of the sleeve 74. Thus, as the lower spigot 28 is introduced to the sleeve 74, a force will act in the axial direction again each of the cam surfaces 84 to initiate the radially inward deflection of the protrusions 76 and the radially elastically deformable fingers 78a. The radially inward deflection of the radially elastically deformable fingers 78a allows for the closure member 16 to move axially relative to the lower spigot 28 in a first axial direction.

Once the closure member 16 is releasably attached to the housing 12, the lower spigot 28 may be fully engaged with the lower bearing 34. Consequently, the lower spigot 28 may have moved axially relative the sleeve 74 such that the protrusions 76 have moved axially beyond a portion of the inner wall of the sleeve 74 that defines, i.e. delimits, the innermost diameter of the sleeve 74. In the illustrated embodiment, the projections 76 remain within the sleeve 74 and are in radial alignment with a portion of the inner wall of the sleeve 74 comprising a diameter substantially equal to, or greater than, the outermost diameter of the lower spigot 28. The inherent resilience of the radially elastically deformable fingers 78a allows them to return to their non-deformed condition when radially aligned with the portion of the sleeve 74 comprising a diameter substantially equal to, or greater than, the outermost diameter of the lower spigot 28. Thus, each of the protrusions 76 move radially outward.

The transition between the portions of the inner wall of the sleeve 74 of different diameters forms a step 86. As in the illustrated embodiment, the step 86 may provide the abutment surface 72. Thus, with the lower spigot 28 fully engaged with the lower bearing 34 and the radially elastically deformable fingers 78a returned to their non-deformed condition, the step 86 may block, i.e. interrupt, an axial path of projections 76. This means that one or more of the projections 76 may abut the step 86 in the event that the closure member 16 is moved axially relative to the lower spigot 28 in a second axial direction, the second axial direction being opposite to the first axial direction. This arrangement may inhibit the closure member 16 from moving axially relative to the lower spigot 28 in a second axial direction. Consequently, this arrangement may inhibit the closure member 16 being separated from the rotary vessel 20, once the lower spigot 28 is fully engaged with the lower bearing 34. This has the advantage that when deconstructing the filter assembly 10, separation of the closure member 16 from the main body 14, e.g. by unscrewing the closure member 16 from the main body 14, may draw the rotary vessel 20 out of the housing 12. Thus, the lower spigot 28 may provide a connector to releasably couple the closure member 16 to the rotary vessel 20 such that the rotary vessel 20 is at least partially removable from the housing 12 by separation of the closure member 16 and the main body 14.

With the closure member 16 releasably attached to the housing 12, the locking member 22 may be attached to the main body 14 to inhibit accidental unsealing and/or separation of the closure member 16 from the main body 14. To releasably attach the locking member 22 to the housing 12, the locking member 22 may be introduced into the open end of the closure member 16. In the illustrated embodiment, attachment of the locking member 22 to the housing 12 may be facilitated by axial alignment of the lugs 42 with the retaining surfaces 68 prior to introduction of the locking member 22 into the open end of the closure member 22. Moreover, the lugs 42 may deform radially outwardly as the locking member 22 is releasably attached to the main body 14. The radial deformation of the lugs 42 may allow the hooked portions 42a to move axially passed the respective retaining surfaces 68. Once the hooked portions 42a have moved axially passed the respective retaining surfaces 68, the inherent resilience of the lugs 42 causes them to return to their non-deformed condition, i.e. move radially inwards. The lugs 42 may be deformed radially outwardly by contact of the hooked portions 42a with the peripheral surface of the main body 14 and/or with the radially extending formations 64. To facilitate the radially outward deformation of the lugs 42, the hooked portions 42a may each comprise a respective cam surface.

Figure 3:
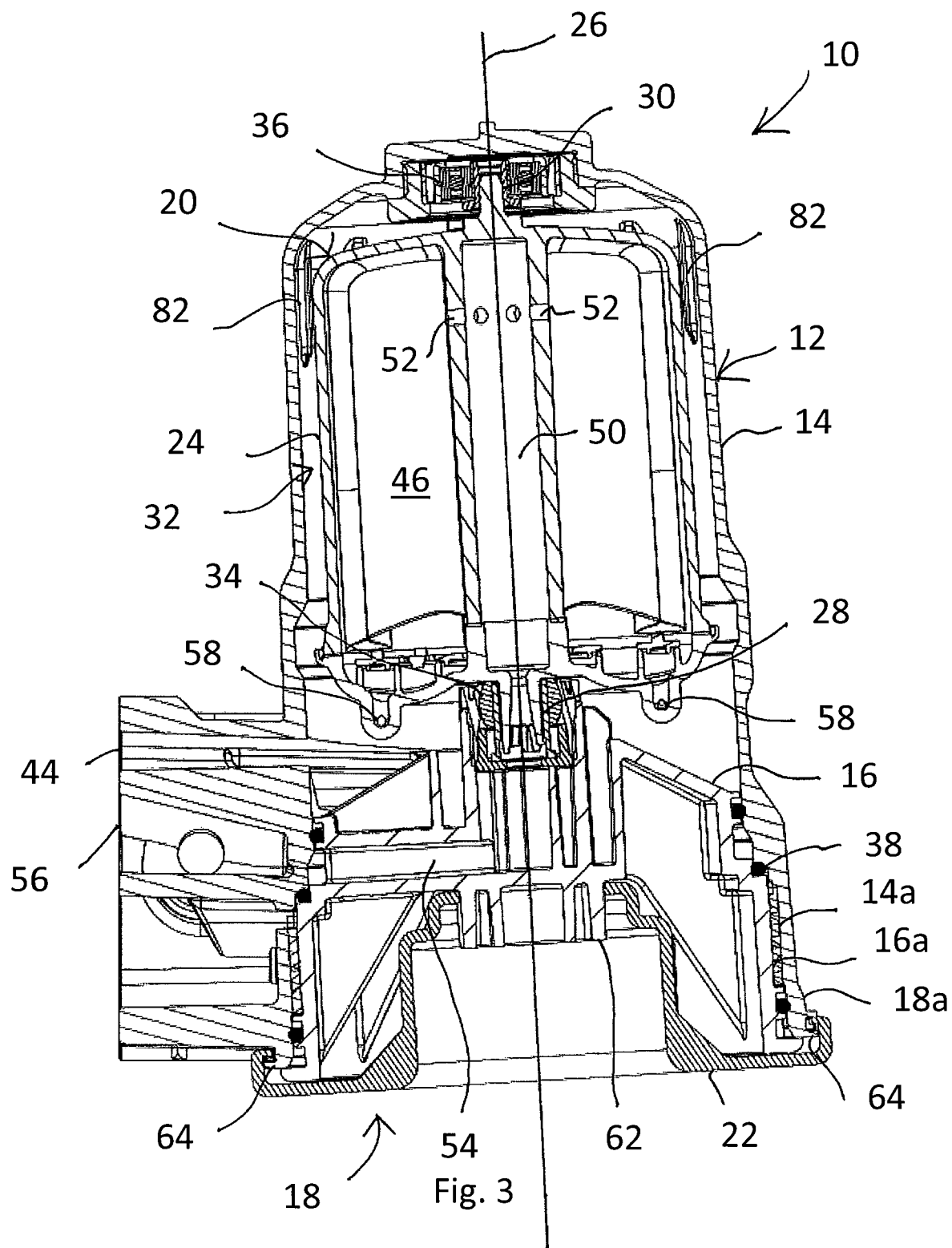
FIG. 3 is a further cross sectional view of the filter assembly of FIG. 1 in which the locking member is shown in a release positon.
Figure 5:
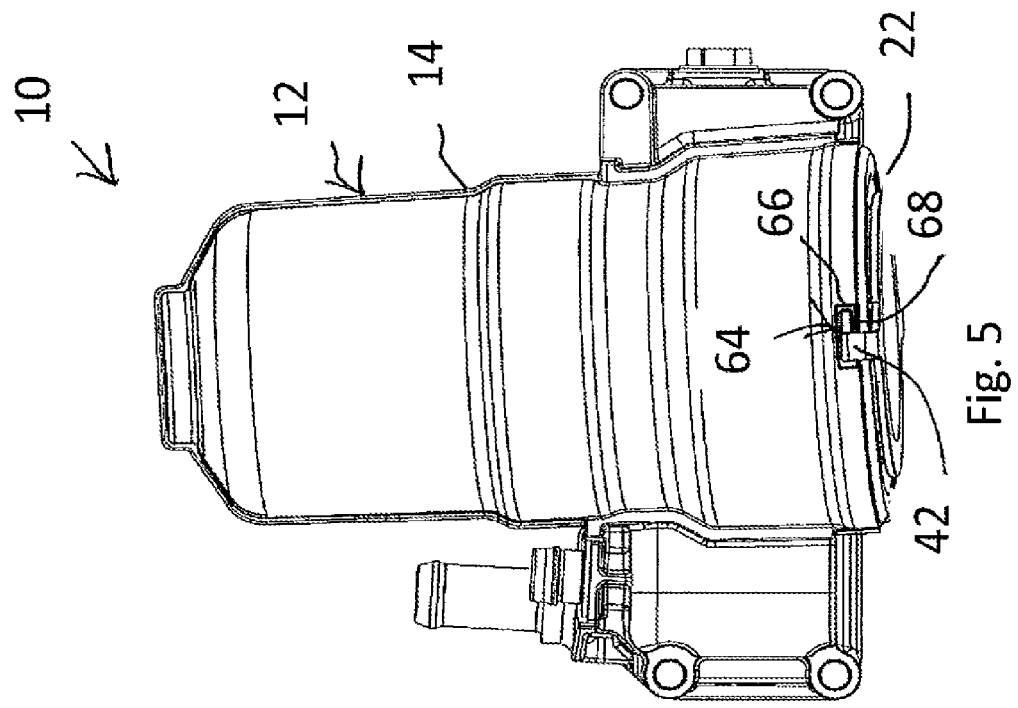
FIG. 5 is a further side view of the filter assembly of FIG. 1 in which the locking member is shown in the release positon.
Figure 4:
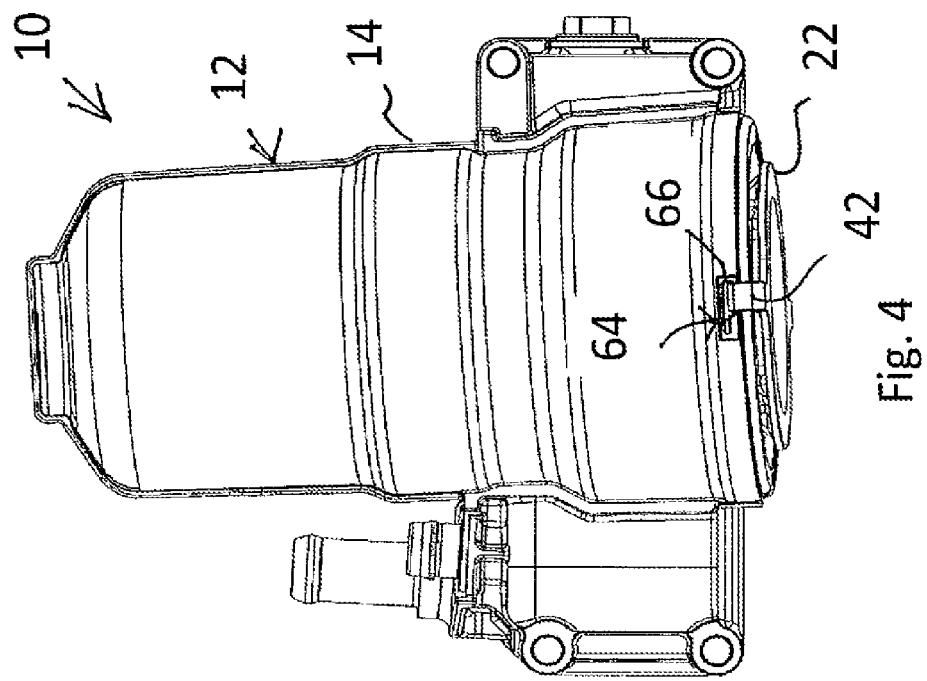
FIG. 4 is a side view of the filter assembly of FIG. 1 in which the locking member is shown in the locking positon.

With the locking member 22 releasably engaged with the main body 14, axial movement of the locking member 22 may be inhibited by abutment of each of the hooked portions 42a against one or more respective retaining surfaces 68. Consequently, release of the locking member 22 from engagement with the main body 14 may be inhibited, thus ensuring the locking member 22 remains engaged with the housing 12 in use. However, with the locking member 22 releasably engaged with the main body 14, the locking member 22 may be axially movable relative to the main body 14 into and out of a locking position. The locking positon is shown in FIGS. 1 and 4, in which rotation of the locking member 22 relative to the housing 12 is inhibited, by abutment of the lugs 42 with the rotation inhibiting surfaces 66. The self-weight of the rotary vessel 20 may act on the closure member 16, and consequently on the locking member 22, to hold the locking member 22 in the locking position. In certain embodiments, the locking member 22 may be axially moveable relative to the main body 14 between the locking position and a release position. The release position is shown in FIGS. 3 and 5. In the release position, the locking member 22 may be rotatable relative to the main body 14 to cause release of the locking member 22 from engagement with the main body 14. In the illustrated embodiment, the locking member 22 is moved in the first axial direction, e.g. upwards, from the locking positon to the release position. In the release position, a circumferential path of the lugs 42 extending about the main body 14 may be clear, i.e. uninterrupted, by the rotation inhibiting surfaces 66, at least in one direction, e.g. in the first direction. As in the illustrated embodiment, the locking member 22 may also be axially movable relative to the closure member 16. This is because with the closure member 16 separably attached to the main body 14, the closure member 22 may not be axially moveable without rotation of the closure member 22 relative to the main body 14. Thus, the locking member 22 may be axially movable relative to the closure member 16 into and out of the locking position.

Thus, in the illustrated embodiment, to remove the rotary vessel 20 from the housing 12, e.g. for cleaning/maintenance, the locking member 22 is moved from the locking position into the release position and rotated in the first direction relative to the main body 14. This action moves the lugs 42 out of axial alignment with the respective retaining surfaces 68 and allows release of the locking member 22 from the main body 14. Rotation of the locking member 22 initiates rotation of the closure member 16. Continued rotation of the closure member 16 in the first direction relative to the main body 14 detaches the closure member 16 from the main body 14, thus allowing separation of the closure member 16 from the main body 14. Separation of the closure member 16 from the main body 14 withdraws the rotary vessel 20 out from within the main body 12.

The invention is not restricted to the details of any foregoing embodiments. For example, certain embodiments of the invention may not include the locking member 22. The invention extends to any novel one, or any novel combination, of the features disclosed in this specification (including any accompanying claims and drawings) or to any novel one, or any novel combination, of the steps of any method or process so disclosed. The claims should not be construed to cover merely the foregoing embodiments, but also any embodiments which fall within the scope of the claims.

In certain embodiments, features described above with reference to the lower spigot 28 and the lower bearing 34 are equally applicable to the upper spigot 30 and the upper bearing 36, respectively. Moreover, the spigots 28, 30 may be provided on the housing 12 and bearings 34, 36 may be provided on the rotary vessel 20. The lower spigot 28 may have a non-circular cross section that is defined, i.e. delimited, by a single part, i.e. this is not defined by the fingers 78a, 78b. In any event, the non-circular cross section may be a polygonal cross section, e.g. a hexagonal cross section. In certain embodiments, the non-circular cross section may be semi-circular cross section. Of course, in certain embodiments, the lower spigot 28 may be circular in cross section. To this end, each of the fingers 78a, 78b may comprise a curved surface, which may be the radially outermost surface of each respective finger 78a, 78b.

In certain embodiments, the closure member 16 may be separable from the main body 14 other than by rotation of the closure member 16 relative to the main body 14. The locking member 22 may be releasably engageable with the closure member 14 by other means than snap-fit engagement. Further, the invention is not limited to self-powerable filter assemblies, such as that which is described above. In certain embodiments, the filter assembly may comprise a drive means, e.g. an electric motor, which is configured to rotate the rotor body 24.

All of the features disclosed in this specification (including any accompanying claims and drawings) and/or all of the steps of any method or process so disclosed, may be combined in any combination, except combinations where at least some of such features and/or steps are mutually exclusive.

Each feature disclosed in this specification (including any accompanying claims and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A rotary vessel for a filter assembly, the rotary vessel comprising:
   a rotor body rotatable about an axis of rotation, the rotor body having:
      a spigot integral with or fixed onto a first axial end of the rotor body, the spigot arranged on the axis of rotation, the spigot comprising:
         axially projecting fingers projecting axially outwardly away from the rotor body, the axially projecting fingers arranged about the axis of rotation;
         wherein the axially projecting fingers include one or more radial protrusions spaced outwardly away from the rotor body and projecting radially outwardly from a radially outer side of the axially projecting fingers;
         wherein radially outer surfaces of the axially projecting fingers, taken together, form an outer surface of the spigot having a non-circular cross-section configured to engage against a complimentary non-circular radial inner cross-section of the annular inner surface of a bearing such that the bearing rotates together with the rotary vessel.

2. The rotary vessel according to claim 1, wherein the non-circular cross-section of the spigot is a polygonal cross section.

3. The rotary vessel according to claim 1, wherein the axially projecting fingers each comprise
   a substantially planar radially outer surface defining-the non-circular cross-section of the spigot.

4. The rotary vessel according to claim 3, wherein the axially projecting fingers each taper in a direction away from the rotor body.

5. The rotary vessel according to claim 3, wherein the axially projecting fingers are spaced about the spigot and separated from each other by intermediate gaps.

6. The rotary vessel according to claim 1, wherein the rotor body comprises
   a drive nozzle configured to emit a pressurized working fluid therefrom to cause rotation of the rotor body by a reactive force so that the rotary vessel is self-powered.

7. The rotary vessel according to claim 1, further comprising:
   the bearing arranged on the axially projecting fingers of the spigot, the bearing comprising:
      an annular sleeve, wherein the axially projecting fingers of the spigot are received into an interior of the annular sleeve and engage the annular sleeve such that the annular sleeve rotates together with the rotary vessel;
      wherein the annular sleeve includes an annular step formed on an annular inner surface of the annular sleeve, the annular step positioned to engage against the one or more radial protrusions of the spigot to inhibit an axial movement of the rotary vessel relative to the bearing;
      wherein radially outer surfaces of the axially projecting fingers, taken together, form an outer surface of the spigot having a non-circular cross-section configured to engage against a complimentary non-circular radial inner cross-section of the annular inner surface of the annular sleeve of the bearing;
      wherein the annular inner surface of the annular sleeve has non-circular cross-section cooperating with and engaging the non-circular cross-section of the spigot, such that the annular sleeve of the bearing rotates together with the rotary vessel.

8. A filter assembly comprising:
   a housing comprising
      a main body and
      a closure member separably attachable to the main body;
      the main body and closure member cooperating to enclose an inner chamber of the housing;
   a rotary vessel having a rotor body disposed within the inner chamber of the housing and having an axis of rotation, the rotary vessel rotatable about the axis of rotation in the housing;
   wherein the rotary vessel comprises:
      a spigot integral with or fixed onto the first axial end of the rotor body facing the closure member, the spigot arranged on the axis of rotation of the rotary vessel, the spigot comprising:
         axially projecting fingers projecting axially outwardly away from the rotor body towards the closure member, the axially projecting fingers arranged about the axis of rotation;

wherein the axially projecting fingers include one or more radial protrusions projecting radially outwardly from a radially outer side of the axially projecting fingers;

the closure member closing over the inner chamber at a first axial end of the housing and configured to retain the rotary vessel inside the housing;

the closure member supporting a bearing, the bearing arranged on and engaging the spigot;

the closure member being separable from the main body to permit removal of the rotary vessel from the housing; and wherein the bearing comprises:

an annular sleeve, wherein the axially projecting fingers of the spigot are received into an interior of the annular sleeve and engage the annular sleeve such that the annular sleeve rotates together with the rotary vessel;

wherein the annular sleeve includes an annular step formed on an annular inner surface of the annular sleeve, the annular step positioned to engage against the one or more radial protrusions of the spigot to inhibit an axial movement of the rotary vessel relative to the closure member;

wherein radially outer surfaces of the axially projecting fingers, taken together, form an outer surface of the spigot having a non-circular cross-section configured to engage against a complimentary non-circular radial inner cross-section of the annular inner surface of the annular sleeve;

wherein the annular inner surface of the annular sleeve has non-circular cross-section cooperating with and engaging the non-circular cross-section of the spigot, such that the annular sleeve of the bearing rotates together with the rotary vessel.

9. The filter assembly according to claim 8, wherein the closure member is separable from the main body by a rotation of the closure member relative to the main body.

\* \* \* \* \*